(12) United States Patent
Chang et al.

(10) Patent No.: US 8,497,846 B2
(45) Date of Patent: Jul. 30, 2013

(54) TOUCH DETECTION METHOD AND TOUCH DETECTOR USING THE SAME

(75) Inventors: Chun-Chieh Chang, Taiwan (TW);
Hui-Hung Chang, Taiwan (TW);
Chih-Chang Lai, Taiwan (TW)

(73) Assignee: Novatek Microelectronics Corp., Hsinchu (TW)

( * ) Notice: Subject to any disclaimer, the term of this patent is extended or adjusted under 35 U.S.C. 154(b) by 137 days.

(21) Appl. No.: 13/233,050

(22) Filed: Sep. 15, 2011

(65) Prior Publication Data
US 2012/0068947 A1 Mar. 22, 2012

(30) Foreign Application Priority Data
Sep. 16, 2010 (TW) .................. 99131506 A

(51) Int. Cl.
*G06F 3/041* (2006.01)
(52) U.S. Cl.
USPC .................. 345/173; 345/175; 178/18.01

(58) Field of Classification Search
USPC ............... 345/173–179; 178/18.01–18.06
See application file for complete search history.

(56) References Cited

U.S. PATENT DOCUMENTS
5,543,591 A  8/1996  Gillespie et al.

*Primary Examiner* — Amare Mengistu
*Assistant Examiner* — Premal Patel
(74) *Attorney, Agent, or Firm* — Rabin & Berdo, P.C.

(57) ABSTRACT

A method for double click detection includes the following steps. Firstly whether first event is detected is determined, if so, first corresponding position is obtained, a period counting is triggered, and first flag is set. Then whether the period ends is judged; if not and the first flag exists, a counter is incremented and second flag is set when first ending event is detected; if not and the second flag exists, second corresponding position is obtained and third flag is set when second event is detected; if not and the third flag exists, the counter is incremented when second ending event is detected; if so, a double click event is determined when the incremented value is greater than a threshold and a distance between the first and the second positions is smaller a threshold.

14 Claims, 5 Drawing Sheets

TOUCH DETECTION METHOD AND TOUCH DETECTOR USING THE SAME

This application claims the benefit of Taiwan application Serial No. 099131506, filed Sep. 16, 2010, the subject matter of which is incorporated herein by reference.

BACKGROUND OF THE INVENTION

1. Field of the Invention

The invention relates in general to a touch detection method and touch detector using the same, and more particularly to a touch detection method and touch detector detecting a double click event triggered by a user.

2. Description of the Related Art

In the ages where technology updates everyday, touch panel has been developed and wildly employed in various electronic applications. In the present skill, capacitive touch panel, which includes a substrate with a transparent electrode, is 1 of the mainstreams of touch panel. The transparent electrode is capable of generating a detectable electrical signal in response to a conductor approaching event, in which a conductor, e.g. a finger of a user, gets close to the transparent electrode. Touch panel supporting touch control operations can be realized by means of detecting and altering the electrical signal.

However, how to create a touch detector, which is capable of precisely detecting various hand gestures of the user, has become a prominent goal of the industries.

SUMMARY OF THE INVENTION

The invention is directed to a touch detection method and touch detector using the same. In comparison to conventional touch detector, the touch detection method and the touch detector are advantageously capable of providing more precise detection result and are realized with more concise detection flow.

According to (a first aspect of) the present invention, a touch detection method applied in a touch detector for detecting a double click event triggered on a touch panel is provided. The touch detection method includes the following steps of: (a) determining whether a first touch event triggered on the touch panel is detected; (b) when the first touch event is triggered, recording a first set of touch location corresponding to the first touch event, activating a counting operation for determining an operation period, and setting an operation flag as a first value; (c) determining whether the operation period ends; (d) when the operation period does not end and the operation flag is corresponding to the first value, determining whether a first touch termination event triggered on the touch panel is detected; if so, having a touch flag ascended by 1, having the operation flag set as a second value, and repeating step (c); (e) when the operation period does not end and the the operation flag is corresponding to the second value, determining whether a second touch event is triggered on the touch panel is detected; if so, recording a second set of touch location corresponding to the second touch event, having the operation flag set as a third value, and repeating step (c); (f) when the operation period does not end and the operation flag corresponding to the third value, determining whether a second touch termination event triggered on the touch panel is detected; if so, the having the touch flag ascended by 1, having the operation flag set as the first value, and repeating step (c); (g) when the operation period does end, determining whether the touch flag corresponds to a value greater than or equal to N+2, and determining whether a set of distances between the first set and the second set locations is smaller than or equal to a threshold, wherein N is an initial value of the touch flag; and (h) when the value of the touch flag is greater than or equal to N+2 and the set of distances is smaller than or equal to the threshold, determining the double click event is achieved.

According to (a second aspect of) the present invention, a touch detector is provided. The touch detector includes a computer readable medium and a processor. The computer readable medium stores program codes. The processor for reading the computer readable medium and executing a touch detection method for detecting a double click event triggered on a touch panel. The touch detection method includes the following steps of: (a) determining whether a first touch event triggered on the touch panel is detected; (b) when the first touch event is triggered, recording a first set of touch location corresponding to the first touch event, activating a counting operation for determining an operation period, and setting an operation flag as a first value; (c) determining whether the operation period ends; (d) when the operation period does not end and the operation flag is corresponding to the first value, determining whether a first touch termination event triggered on the touch panel is detected; if so, having a touch flag ascended by 1, having the operation flag set as a second value, and repeating step (c); (e) when the operation period does not end and the operation flag is corresponding to the second value, determining whether a second touch event is triggered on the touch panel is detected; if so, recording a second set of touch location corresponding to the second touch event, having the operation flag set as a third value, and repeating step (c); (f) when the operation period does not end and the operation flag corresponding to the third value, determining whether a second touch termination event triggered on the touch panel is detected; if so, the having the touch flag ascended by 1, having the operation flag set as the first value, and repeating step (c); (g) when the operation period does end, determining whether the touch flag corresponds to a value greater than or equal to N+2, and determining whether a set of distances between the first set and the second set locations is smaller than or equal to a threshold, wherein N is an initial value of the touch flag; and (h) when the value of the touch flag is greater than or equal to N+2 and the set of distances is smaller than or equal to the threshold, determining the double click event is achieved.

The above and other aspects of the invention will become better understood with regard to the following detailed description of the preferred but non-limiting embodiment(s). The following description is made with reference to the accompanying drawings.

DETAILED DESCRIPTION OF THE INVENTION

The touch detection method according to the present embodiment of the invention detects a double click event of a user with reference to location information and time information thereof.

Figure 1:
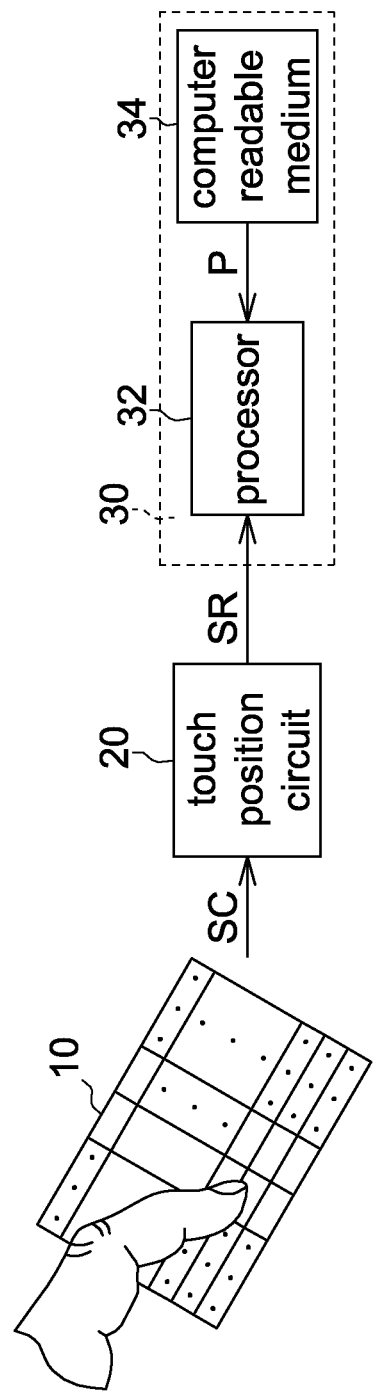
FIG. 1 shows a block diagram of the touch detector according to the present embodiment of the invention.

Referring to FIG. 1, a block diagram of the touch detector according to the present embodiment of the invention. For example, the touch detector 30 is applied in a touch display system 1, which further includes a touch panel 10 and a touch position circuit 20. In an embodiment, the touch panel 10 is a capacitive touch panel. The touch panel 10 includes, for example, a touch electrode for providing a touch electric signal Sc in response to an operation event, in which a conductor, e.g. a finger of the user, approaching the touch electrode. The touch position circuit 20 obtains position information Sp according to the electric signal Sc, wherein the position information Sp indicates a position of the touch panel 10, which the conductor is getting close to.

Figure 2A:
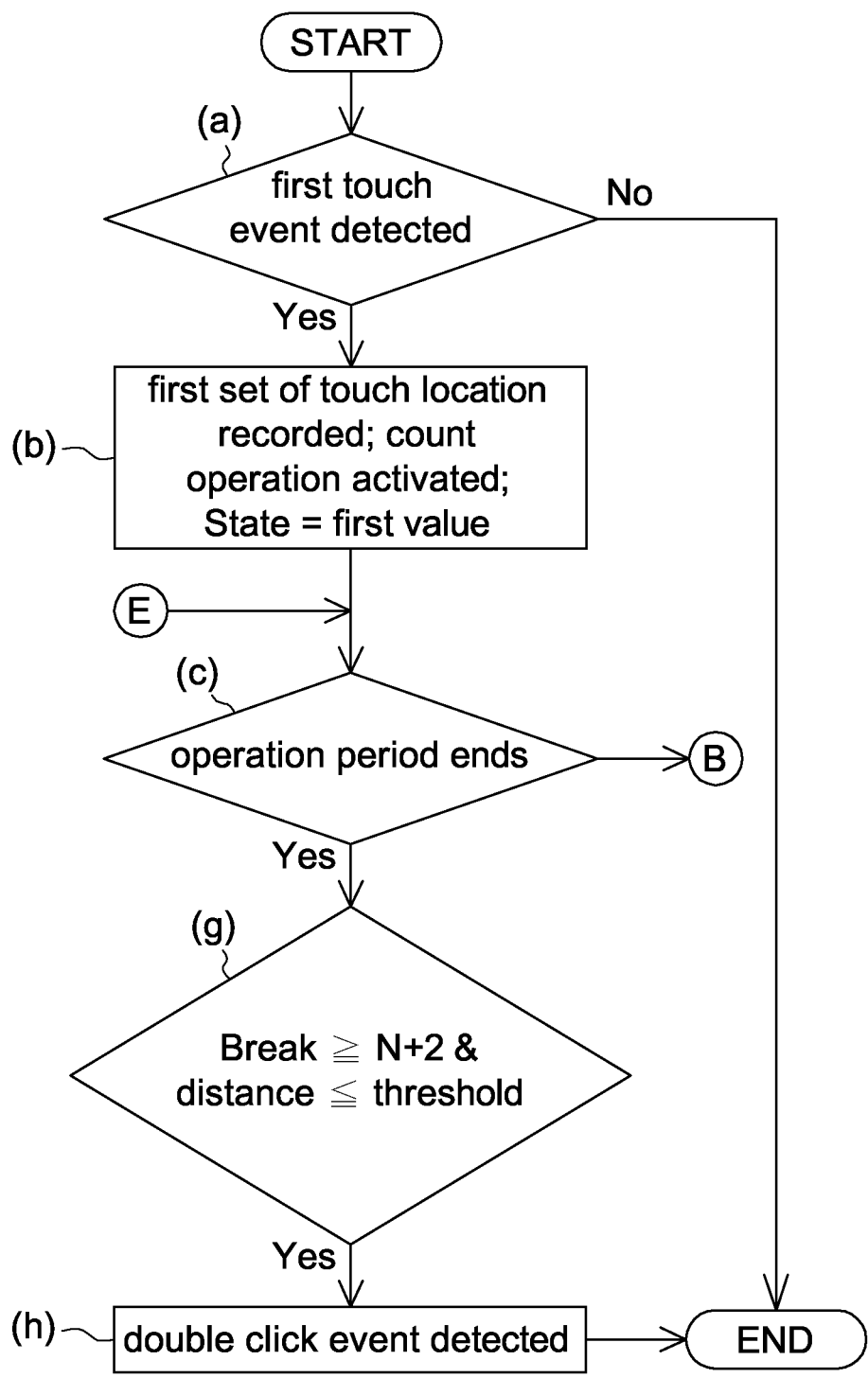
FIGS. 2A and 2B show a flow chart of the touch detection method according to the present embodiment of the invention.
Figure 2B:
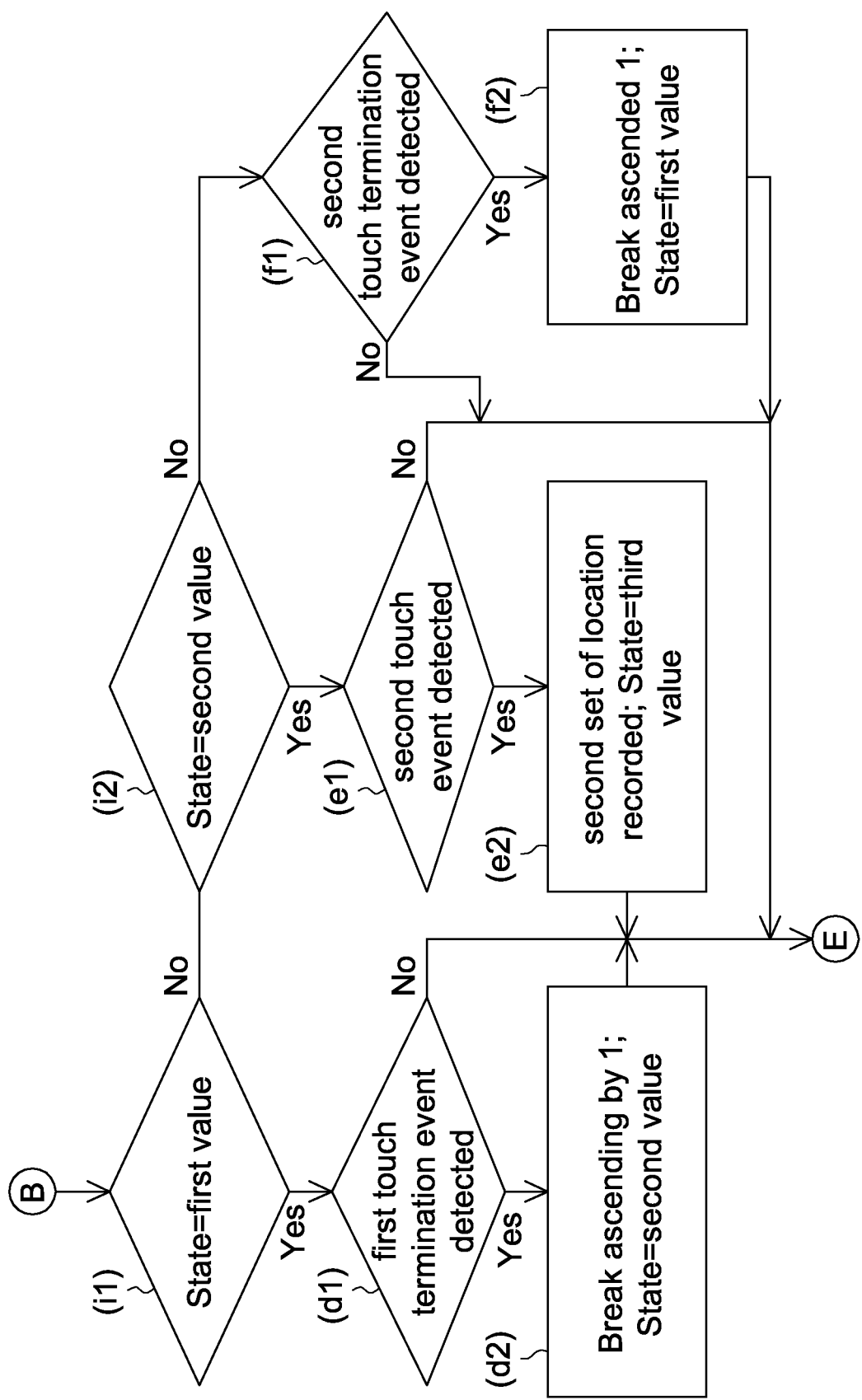

The touch detector 30 receives the position information Sp and carries out a touch detection method for determining whether the operation event triggered by the user is a double click event. For example, the touch detector 30 includes a processor 32 and a computer readable medium 34. The computer readable medium 34 stores program code P and the processor 32 accesses the program code P stored in the computer readable medium 34 for executing the position detection method. In an embodiment, the position detection method includes the following steps, as shown in FIGS. 2A and 2B.

As shown in step (a), the process 32 determines whether first touch event triggered on the touch panel 10 is detected. For example, the first touch event corresponds with an event, in which a single conductor, e.g. a finger of a user, approaches an area Ax within the touch panel 10. When the first touch event is detected, entering step (b), the processor 32 finds out and records a first set of touch location corresponding to the first touch event according to the position information Sp. For example, the first set of touch location is represented as coordinate position information (X0,Y0), which indicates the correlation of the area Ax with respect to the touch panel 10. The processor 32 further activates a counting operation for determining an operation period TP and setting an operation flag State as a first value. For example, the first value of the operation flag State is 0.

Then proceeding to step (c), the processor 32 determines whether the operation period TP ends; if not, the processor 32 executes steps (i1) and (i2) for respectively determining whether the operation flag State corresponds to the first value and determining whether the operation flag State corresponds to a second value. For example, the second value of the operation flag State is 1.

After step (i1), when the operation flag State corresponds to the first value, it is indicated that the touch detector 30 has detected the first touch event. Under the present condition, the processor 32 executes steps (1) and (d2) for carrying out an operation sequence detecting a first touch termination event corresponding to the first touch event. For example, the first touch termination event corresponds with an event, in which the conductor, employed by the user, stops touching the area Ax and moves away from the touch panel 10.

More specifically, the processor 32 determines whether a first touch termination event triggered on the touch panel 10 is detected in step (d1); if not, step (c) is repeated; if so, the method proceeds to step (d2), where the processor 32 has a touch flag Break ascending by 1, so that the touch flag is equal to N+1. The processor 32 further has the operation flag State set as the second value. N is an initial value of the touch flag Break, wherein N is for example, equal to 0. After step (d2), the touch flag Break corresponds with the value of 1 and it is indicated that the touch detector 30 has detected a single click event (including the first touch event and the first touch termination event). The processor 32 further, after step (d2), repeats step (c), for determining whether the operation period TP ends. When the operation period TP does not ends, the processor 32 further executes steps (i1) and (i2), so as to determine the value of the operation flag State.

When the operation flag State corresponds to the second value, it is indicated that the touch detector 30 has detected the first touch event and the first touch termination event. Under the condition, the processor 32 executes an operation flow, which includes steps (e1) and (e2), for detecting a second touch event. For example, similar to the first touch event, the second touch event corresponds with an event, in which a single conductor, e.g. the finger of the user, approaches an area Ax' within the touch panel 10.

More specifically, the processor 32 determines whether a second touch event triggered on the touch panel 10 is detected in step (e1); if not, step (c) is repeated; if so, the method proceeds to step (e2), where the processor 32 finds out and records a second set of touch location corresponding to the second touch event according to the position information Sp and sets the operation flag State as a third value. For example, the third value of the operation flag State is 2 and the second set of touch location is represented as coordinate position information (X1,Y1), which indicates the correlation of the area Ax' with respect to the touch panel 10. The processor 32 further, after step (e2), repeats step (c) for determining whether the operation period TP ends; if not, the method proceeds to steps (i1) and (i2) for determining the value of the operation flag State.

When the operation flag State corresponds to the third value, it is indicated that the touch detector 30 achieves a third operation status, where the touch detector 30 has detected the first touch event, the first touch termination event, and the second touch event. Under the third operation status, the processor 32 carries out an operation sequence including steps (f1) and (f2) for detecting a second touch termination event corresponding to the second touch event. For example, similar to the first touch termination event, the second touch termination event corresponds with an event, in which the conductor, employed by the user, stops touching the area Ax' and moves away from the touch panel 10.

More specifically, the processor 32 determines whether the second touch termination event triggered on the touch panel 10 is detected in step (f1); if not, step (c) is repeated; if so, the method proceeds to step (f2), where the processor 32 has a touch flag Break ascending by 1. The touch flag Break has been ascended from 0 to 1 when the touch detection method proceeded to steps (d2), so that the touch flag Break is equal to the value of 2 after the ascending operation in steps (f1) and (f2). The processor 32 further has the operation flag State set as the first value. Thus, the touch flag Break corresponds with the value of 2 and it is indicated that the touch detector 30 has detected a double click event (including the first touch event, the first touch termination event, the second touch event, and the second touch termination event) after step (f2). The processor 32 further, after step (f2), repeats step (c), for determining whether the operation period TP ends.

As discussed in the previous paragraphs, after the loop operations of steps (d1)-(d2), (e1)-(e2), and (f1)-(f2), the processor 32 can effectively achieve the detection of the double click event triggered by the user.

When the processor 32 determines the operation period TP ends in step (c), the method proceeds to step (g), where the processor 32 determines whether the touch flag Break is greater than or equal to the value of N+2, and determines whether a distance between the first set and the second set of touch locations, i.e. the distance between the coordinate position information (X0,Y0) and (X1,Y1) is smaller than or equal to a threshold, wherein N is the initial value of the touch flag Break. When the touch flag Break is greater than or equal to the value of N+2 and the distance is smaller than or equal the threshold, the method proceeds to step (h), where the processor 32 determines the double click event is detected.

In other words, the touch detector 30 according to the present embodiment of the invention carries out detection of the double click event triggered by the user under the criterion that the distance between the two single click events is smaller than (or equal to) the threshold and the time span therebetween is smaller than (or equal to) the operation period TP.

Figure 3A:
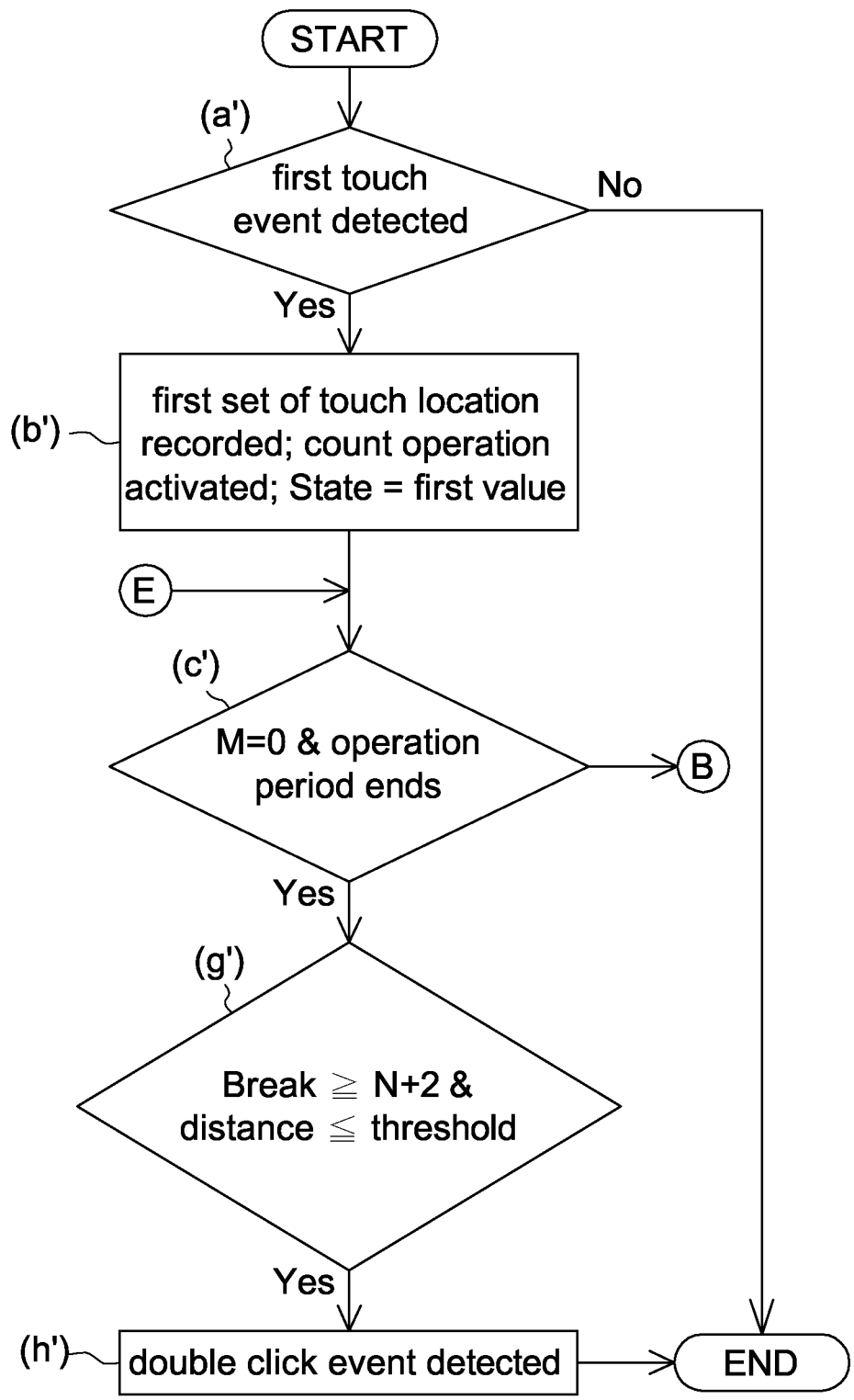
FIGS. 3A and 3B show another flow chart of the touch detection method according to the present embodiment of the invention
Figure 3B:
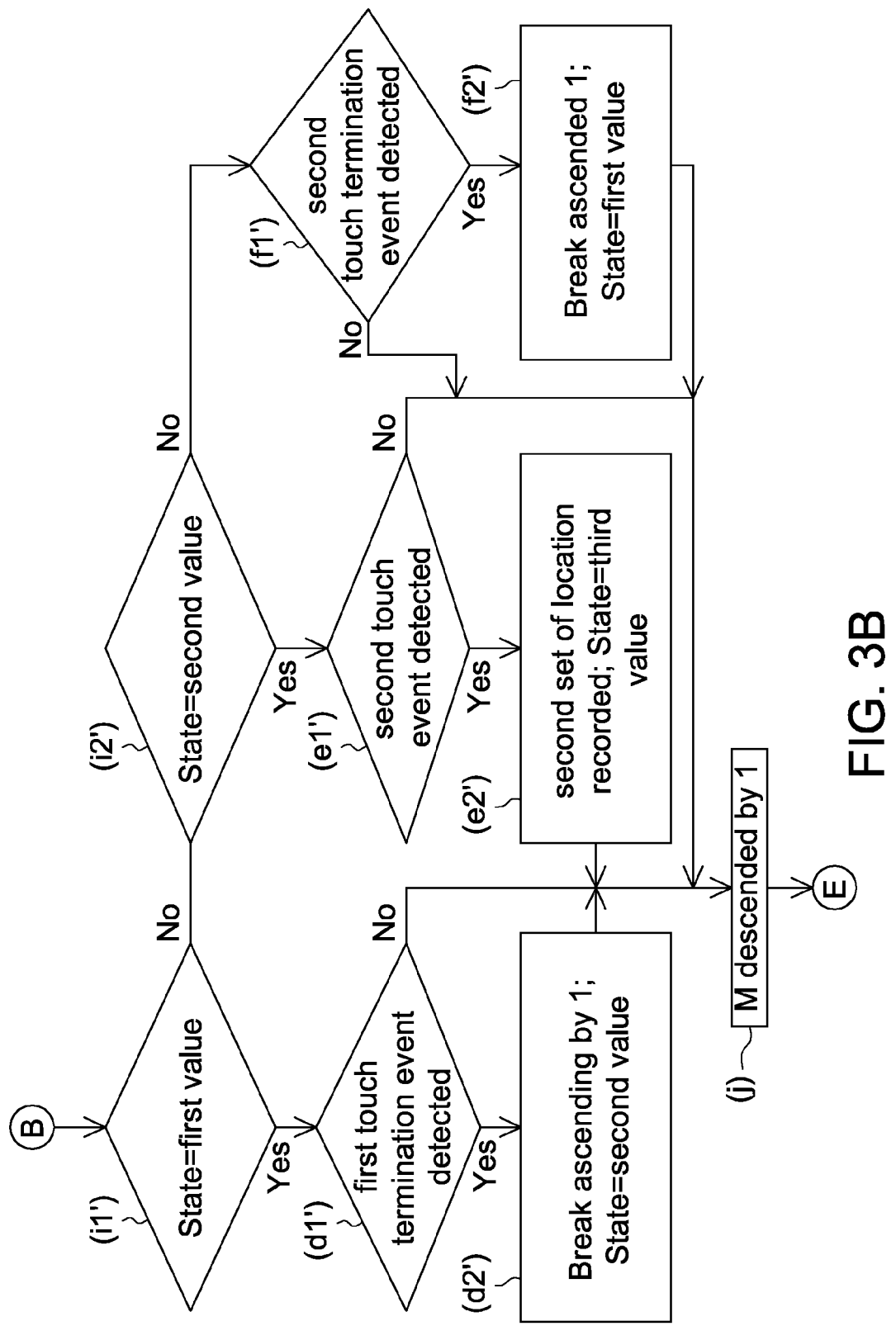

In an embodiment, the operation activating a time-counting operation for determining the operation period TP of the processor 32 is realized by a counter. In detail, the processor 32 sets the counter corresponding to a count value M and the length of the operation period TP is determined by the count value M and the maximum time lapse needed for the touch sensor 32 executing steps (i1)-(i2), (d1)-(d2), (e1)-(e2), and (f1)-(f2), wherein M is a natural number greater than 1. In this embodiment, the touch detection method further includes step (j) executed after steps (d2'), (e2'), and (2') for descending the count value M by 1 before step (c) is repeated; the touch detection method further, in step (c), determines whether the count value M corresponds to the value of 0, so as to determine whether the operation period TP ends, as depicted in FIGS. 3A and 3B. For an exemplary case, the maximum time lapse for the touch detector 30 to execute steps (i1)-(i2), (d1)-(d2), (e1)-(e2), and (f1)-(f2) is 10 microseconds (ms), and the value of the count value M is 50. Thus, the operation period TP has a length of 500 ms.

Though only the situation that the first and the second touch events correspond with an event where a conductor, e.g. a finger of the user, approaching the touch electrode is cited as an example in the present embodiment, approaching the touch electrode, the touch detector 30 according to the present embodiment is not limited thereto.

In other example, the first and the second touch events may also correspond with an event where multiple conductors, e.g. two or more than two fingers of the user, approach and touch the touch panel 30. In this example, the first and the second touch events measured in steps (a) and (e) of the touch detection method correspond with an event with multiple conductors approaching the touch panel 10; the first and the second touch termination events measured in steps (d) and (f) correspond with an event with multiple conductors move away from the touch panel 10. Besides, the first and the second sets of touch locations recorded in steps (b) and (e2) of the touch detection method respectively correspond to multiple first touch locations and multiple second touch locations with one to one correspondence relation. Besides, the distance referred in steps (g) and (h) includes multiple sub-distances between the respective multiple first touch locations and their corresponding multiple second touch locations, and step (h) is performed when all of the sub-distances are smaller than the threshold.

The touch detection method and the touch detector using the same employ a criterion that distance between the triggered locations of two single click events is within a threshold and the total operation period of the two single click events is smaller than or equal to an operation period for detecting a double click event triggered by a user. Thus, in comparison to conventional touch detector, the touch detection method and the touch detector according to the present embodiment are advantageously capable of providing more precise detection result and are realized with more concise detection flow.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch detection method applied in a touch detector for detecting a double click event triggered on a touch panel, the touch detection method comprising:
   (a) determining whether a first touch event triggered on the touch panel is detected;
   (b) when the first touch event is triggered, recording a first set of touch location corresponding to the first touch event, activating a counting operation for determining an operation period, and setting an operation flag as a first value;
   (c) determining whether the operation period ends;
   (d) when the operation period does not end and the operation flag is corresponding to the first value, determining whether a first touch termination event triggered on the touch panel is detected; if so, having a touch flag ascended by 1, having the operation flag set as a second value, and repeating step (c);
   (e) when the operation period does not end and the operation flag is corresponding to the second value, determining whether a second touch event is triggered on the touch panel is detected; if so, recording a second set of touch location corresponding to the second touch event, having the operation flag set as a third value, and repeating step (c);
   (f) when the operation period does not end and the operation flag corresponding to the third value, determining whether a second touch termination event triggered on the touch panel is detected; if so, the having the touch flag ascended by 1, having the operation flag set as the first value, and repeating step (c);
   (g) when the operation period does end, determining whether the touch flag corresponds to a value greater than or equal to N+2, and determining whether a set of distances between the first set and the second set locations is smaller than or equal to a threshold, wherein N is an initial value of the touch flag; and
   (h) when the value of the touch flag is greater than or equal to N+2 and the set of distances is smaller than or equal to the threshold, determining the double click event is achieved.

2. The touch detection method according to claim 1, wherein when the operation period does not end, the touch detection method, after step (c), further comprising:
   (i1) determining whether the operation flag corresponds to the first value; if so, step (d) is performed; and
   (i2) determining whether the operation flag corresponds to the second value; if so, step (e) is performed, wherein, when the operation flag does not corresponds to the first flag and the second flag, step (f) is performed.

3. The touch detection method according to claim 1, wherein step (b) further comprises:
   (b1) having a timer set with a count value M, wherein the operation period is determined by the count value M and time needed for the touch detector executing steps (d)-(f).

4. The touch detection method according to claim 3, further comprising:
   (j) having the count value descending by 1 after steps (d)-(f) ends and before step (c) is repeated, wherein, step (j) is executed between steps (d)-(f) and step (c).

5. The touch detection method according to claim 4, wherein step (c) further comprises:
(c1) determining whether the operation period ends by means of determining whether the count value M corresponds to 0.

6. The touch detection method according to claim 1, wherein the first and the second touch events recited in steps (a) and (e) correspond with an event in which a single conductor approaches the touch panel, and the first and the second touch termination events correspond with an event in which the single conductor moves away from the touch panel.

7. The touch detection method according to claim 1, wherein the first and the second touch events recited in steps (a) and (e) correspond with an event in which a plurality of conductors approach the touch panel, and the first and the second touch termination events correspond with an event in which the conductors move away from the touch panel, wherein,
the first set and the second set of touch locations respectively comprise a plurality of first touch locations and a plurality of second touch locations, which correspond with the respective first touch locations, and the corresponding first and second touch locations are employed for determining a plurality of distances within the set of distances.

8. A touch detector, comprising:
a non-transitory computer readable medium, storing program codes; and
a processor, for reading the computer readable medium and executing a touch detection method for detecting a double click event triggered on a touch panel, the touch detection method comprising:
(a) determining whether a first touch event triggered on the touch panel is detected;
(b) when the first touch event is triggered, recording a first set of touch location corresponding to the first touch event, activating a counting operation for determining an operation period, and setting an operation flag as a first value;
(c) determining whether the operation period ends;
(d) when the operation period does not end and the operation flag is corresponding to the first value, determining whether a first touch termination event triggered on the touch panel is detected; if so, having a touch flag ascended by 1, having the operation flag set as a second value, and repeating step (c);
(e) when the operation period does not end and the operation flag is corresponding to the second value, determining whether a second touch event is triggered on the touch panel is detected; if so, recording a second set of touch location corresponding to the second touch event, having the operation flag set as a third value, and repeating step (c);
(f) when the operation period does not end and the operation flag corresponding to the third value, determining whether a second touch termination event triggered on the touch panel is detected; if so, the having the touch flag ascended by 1, having the operation flag set as the first value, and repeating step (c);
(g) when the operation period does end, determining whether the touch flag corresponds to a value greater than or equal to N+2, and determining whether a set of distances between the first set and the second set locations is smaller than or equal to a threshold, wherein N is an initial value of the touch flag; and
(h) when the value of the touch flag is greater than or equal to N+2 and the set of distances is smaller than or equal to the threshold, determining the double click event is achieved.

9. The touch detector according to claim 8, wherein when the operation period does not end, the touch detection method, after step (c), further comprising:
(i1) determining whether the operation flag corresponds to the first value; if so, step (d) is performed; and
(i2) determining whether the operation flag corresponds to the second value; if so, step (c) is performed, wherein, when the operation flag does not corresponds to the first flag and the second flag, step (f) is performed.

10. The touch detector according to claim 8, wherein step (b) further comprises:
(b1) having a timer set with a count value M, wherein the operation period is determined by the count value M and time needed for the touch detector executing steps (d)-(f).

11. The touch detector according to claim 10, further comprising:
(j) having the count value descending by 1 after steps (d)-(f) ends and before step (c) is repeated, wherein,
step (j) is executed between steps (d)-(f) and step (c).

12. The touch detector according to claim 11, wherein step (c) further comprises:
(c1) determining whether the operation period ends by means of determining whether the count value M corresponds to 0.

13. The touch detector according to claim 8, wherein the first and the second touch events recited in steps (a) and (e) correspond with an event in which a single conductor approaches the touch panel, and the first and the second touch termination events correspond with an event in which the single conductor moves away from the touch panel.

14. The touch detector according to claim 8, wherein the first and the second touch events recited in steps (a) and (e) correspond with an event in which a plurality of conductors approach the touch panel, and the first and the second touch termination events correspond with an event in which the conductors move away from the touch panel, wherein,
the first set and the second set of touch locations respectively comprise a plurality of first touch locations and a plurality of second touch locations, which correspond with the respective first touch locations, and the corresponding first and second touch locations are employed for determining a plurality of distances within the set of distances.

* * * * *